(12) United States Patent
Sciancalepore et al.

(10) Patent No.: US 11,197,261 B2
(45) Date of Patent: Dec. 7, 2021

(54) SERVICE LOCATION METHOD AND SYSTEM FOR MMWAVE CELLULAR ENVIRONMENTS

(71) Applicant: NEC Laboratories Europe GmbH, Heidelberg (DE)

(72) Inventors: Vincenzo Sciancalepore, Heidelberg (DE); Fabio Giust, Cittadella (IT); Konstantinos Samdanis, Munich (DE); Xavier Costa Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 276 days.

(21) Appl. No.: 16/324,588

(22) PCT Filed: Aug. 12, 2016

(86) PCT No.: PCT/EP2016/069289
§ 371 (c)(1),
(2) Date: Feb. 11, 2019

(87) PCT Pub. No.: WO2018/028798
PCT Pub. Date: Feb. 15, 2018

(65) Prior Publication Data
US 2021/0227488 A1    Jul. 22, 2021

(51) Int. Cl.
*H04W 64/00* (2009.01)
*H04B 7/06* (2006.01)

(52) U.S. Cl.
CPC ........ *H04W 64/003* (2013.01); *H04B 7/0617* (2013.01)

(58) Field of Classification Search
CPC ............................ H04W 64/003; H04B 7/0617

USPC ...................................................... 455/456.1
See application file for complete search history.

(56) References Cited

U.S. PATENT DOCUMENTS

| 8,195,191 B1* | 6/2012 | Falk | H04W 64/00 455/456.1 |
| 2003/0117320 A1* | 6/2003 | Kim | G01S 11/02 342/457 |

OTHER PUBLICATIONS

Antonio Capone et al: "Context Information for Fast Cell Discovery in mm-wave 5G Networks", Jan. 9, 2015 (Jan. 9, 2015), XP055369130, pp. 1-6.

(Continued)

*Primary Examiner* — Joel Ajayi
(74) *Attorney, Agent, or Firm* — Leydig, Voit & Mayer, Ltd.

(57) ABSTRACT

A method provides location information within a mobile network with beamforming characteristics. The mobile network includes at least one access point or base station that includes a beamforming module. The method includes tracing and maintaining user terminals' location information in a location service deployed in the mobile network, providing the location information of a user's terminal from the location service to the beamforming module of the at least one access point or base station in order to assist beamforming and association between the user's terminal and the at least one access point or base station, and providing the location information of the user's terminal from the at least one access point or base station to the location service in order to populate, update, and/or refine a location information base of the location service.

11 Claims, 7 Drawing Sheets

(56) References Cited

OTHER PUBLICATIONS

Di Taranto Rocco et al: "Location-Aware Communications for 5G Networks: How location information can improve scalability, latency, and robustness of 5G", IEEE Signal Processing Magazine, vol. 31, No. 6, Nov. 1, 2014 (Nov. 1, 2014), pp. 102-112, XP011561532.
Zhu Xiaoyi et al: "Spatial Reuse for Location-Aided Multi-User Beamforming in 60 GHz WPAN Systems", 2013 IEEE $77^{TH}$ Vehicular Technology Conference (VTC Spring), IEEE, Jun. 2, 2013 (Jun. 2, 2013), pp. 1-5, XP032547958.
Congzheng Han et al: "Location-Aided Multi-User Beamforming for 60GHz WPAN Systems", 2012 IEEE $75^{TH}$ Vehicular Technology Conference (VTC Spring 2012); May 6-9, 2012, May 6, 2012), pp. 1-5, XP032202395.
Garcia Nil et al: "Location-aided mm-wave channel estimation for vehicular communication", 2016 IEEE $77^{TH}$ International Workshop On Signal Processing Advances in Wireless Communications (SPAWC), Jul. 3, 2016 (Jul. 3, 2016), pp. 1-5, XP032940098.
3GPP TS 23.303 V13.3.0 (Mar. 2016), 3rd Generation Partnership Project; Technical Specification Group Services and System Aspects; Proximity-based services (ProSe); Stage 2(Release 13), Mar. 2016, pp. 1-124.

\* cited by examiner

SERVICE LOCATION METHOD AND SYSTEM FOR MMWAVE CELLULAR ENVIRONMENTS

CROSS-REFERENCE TO PRIOR APPLICATIONS

This application is a U.S. National Stage Application under 35 U.S.C. § 371 of International Application No. PCT/EP2016/069289 filed on Aug. 12, 2016. The International Application was published in English on Feb. 15, 2018 as WO 2018/028798 A1 under PCT Article 21(2).

FIELD

The present invention relates to a service location method and system for mmWave cellular environments.

BACKGROUND

Millimeter wave technologies (also known as mm-waves or mmWaves) are gaining momentum in the emerging mobile network deployments as the most promising communication medium for ultra-dense environments. Short wavelength transmissions ensure a higher spectral efficiency, while minimizing the path-loss impairment, thus enabling the ultra-capacity feature of mmWave communications. However, high-frequency connections require directional transmissions incurring in a number of design challenges. In particular, advanced beamforming mechanism have been proposed and devised by following tracking and tracing procedures. In particular, an incoming user interested in the available ultra-capacity starts a so called 'engagement' procedure in order to connect with the mmWave access point. The mmWave access point needs to identify the user's terminal location for synchronization purposes, i.e. to hook the terminal's synchronization signal and to initiate the handshake process. Once the user's terminal is successfully connected to the mmWave access point, tracking and tracing procedures allow obtaining the detailed position of the terminal and enable terminal movements without incurring in connection loss.

Examples considering the mmWave specifics are provided by the IEEE 802.11ad standard (cf. IEEE 802.11ad standard: "Enhancements for Very High Throughput in the 60 GHz Band") and the WiGig standard (cf. Wireless Gigabit Alliance, Inc., "WiGig MAC and PHY Specification"), which aim to offer ultra-capacity facilities by the means of 60 GHz band using single carrier and OFDM modulations and exhibiting up to 6.7 Gpbs (in case of 80211ad). In these standards, bidirectional sequences of beamforming training frame transmission are devised in order to sweep all spatial sectors and facilitate the necessary signaling. The protocol takes into account sector-level sweep, beam refinement protocol and beam tracking. When the beacon is sent, several sector sweep frames are transmitted as training signals in order to measure the quality of the received frames using a quasi-omnidirectional beam-pattern. Based on the feedback, the sector with the highest channel gain is selected and used for the next transmissions. Once the transmitter and receiver are aligned, the beam refinement protocol starts iterative refinements of the beamforming configuration to face signal attenuations due to dynamic obstacles and/or channel impairments. For both protocols, special frames are used to train the beamforming configurations.

While this basic protocol, already proposed and standardized, provides a good baseline, its usage and the interaction with the application layer, i.e. how the application layer can take advantage of user locations and beamforming operations is still open. Methods that can enhance the discovery procedure, in terms of speed during the user discovery phase as well as the communication efficiency are desirable since they play a key-role in several user-related cellular operations. Unfortunately, there is no clear view on how to relate the beamforming discovery and the application and how they could be inter-connected to improve the association process for particular applications. Conversely, applications may take advantage from using the antenna directivity to exploit the user mobility statistics for a particular area of interest.

SUMMARY

According to an embodiment of the present invention, a method provides location information within a mobile network with beamforming characteristics. The mobile network includes at least one access point or base station that includes a beamforming module. The method includes tracing and maintaining user terminals' location information in a location service deployed in the mobile network, providing the location information of a user's terminal from the location service to the beamforming module of the at least one access point or base station in order to assist beamforming and association between the user's terminal and the at least one access point or base station, and providing the location information of the user's terminal from the at least one access point or base station to the location service in order to populate, update, and/or refine a location information base of the location service.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
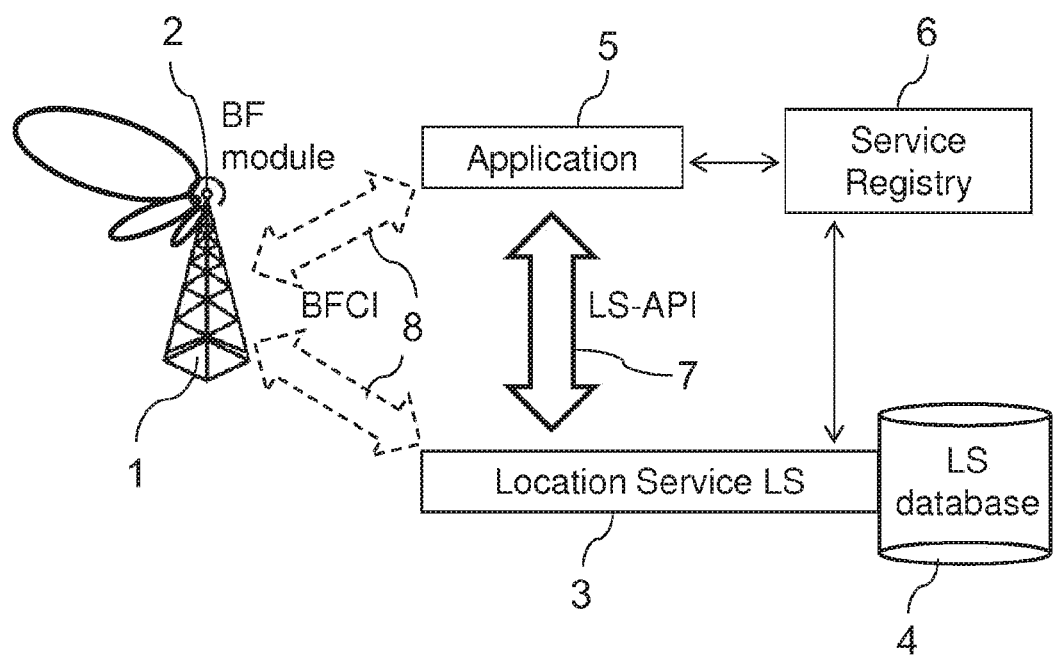
FIG. 1 is a schematic view illustrating a system overview with functional entities and interfaces in accordance with embodiments of the present invention.

In view of the above, embodiments of the present invention improve and further develop a method, a device and a system for providing location information within a mobile network with beamforming characteristics in such a way that the efficiency of a user terminal's discovery procedure is improved.

The present invention relates to a method for providing location information within a mobile network with beamforming characteristics, where the network includes at least one access point or base station that includes a beamforming module. Furthermore, the present invention relates to a device and a system for providing location information within a mobile network with beamforming characteristics.

In accordance with the invention, a method provides location information within a mobile network with beamforming characteristics, where the network includes at least one access point or base station that includes a beamforming module, the method including:

tracing and maintaining user terminals' location information in a location service entity deployed in the mobile network, providing location information of a user's terminal from the location service entity to the beamforming module of the at least one access point or base station in order to assist beamforming and association between the user's terminal and the at least one access point or base station, and providing location information of a user's terminal from the at least one access point or base station to the location service entity in order to populate, update and/or refine a location information base of the location service entity.

Furthermore, a device provides location information within a mobile network with beamforming characteristics. The device includes:

a location service entity including means for collecting user terminals' location information, and a location service database connected with the location service entity for storing the user terminals' location information, where the location service entity is configured to provide location information of a user's terminal to a beamforming module of at least one access point or base station of the mobile network in order to assist beamforming and association between the user's terminal and the at least one access point or base station, and where the location service entity is configured to receive location information of a user's terminal from the at least one access point or base station in order to populate, update and/or refine the location service database.

Still further, a system provides location information within a mobile network with beamforming characteristics The system includes:

at least one access point or base station including a beamforming module, a location service entity configured to trace and maintain user terminals' location information, where the location service entity is configured to provide location information of a user's terminal to the beamforming module of the at least one access point or base station via a beamforming control interface in order to assist beamforming and association between the user's terminal and the at least one access point or base station, and where the at least one access point or base station is configured to provide location information of a user's terminal to the location service entity (3) in order to populate, update and/or refine a location information base of the location service entity.

According to the invention, it has been recognized that, in state-of-the-art solutions, a limitation is represented by a strong relationship between the location service facilities (such as algorithms, database and application platform) and the antenna beamer, which is guided on a real-time basis in order to discover a user terminal and to provide location information. Embodiments of the present invention perform a decoupling between the directional antenna beamer, i.e. the beamforming module, and applications aiming at finding a user terminal and storing the location information. For example, embodiments enable decoupling the logic to control and configure a small cell deployment, e.g. mmWave-based, from the transceivers elements.

Embodiments of the present invention relate to a method, a device, and a system that connect a mmWave-based small cell deployments to a location service (e.g., in MEC, Mobile Edge Computing, context, implemented by a Mobile edge platform and/or installed in a Mobile edge host) for LTE and emerging 5G networks, which is accessible by applications that can be owned by the network operator, provided by the system manufacturer and/or by a third party. The system leverages the location service enabling the application layer to feed the mmWave access point's beamforming module with relevant information about a user's terminal location in order to start a user terminal engagement phase, and, similarly, exploits the granularity offered by sophisticated beamforming techniques to refine the location estimation and make it available for future network association procedures. According to an embodiment the system enables: i) the provisioning of location information (in a specific data model) from the location service in the network to an access point with beamforming capabilities in order to assist the beam steering and association between a user's terminal and the access point, and also ii) the provisioning of user location information (in a specific data model) from an access point to the location service in the network in order to populate/update/refine the information base of the location service.

Hence, the interplay between an access point, e.g. a mmWave access point, and a location service, e.g. implemented in connection with a MEC system, can benefit both parties in terms of performance and information accuracy. Consequently, embodiments of the invention can speed up the association procedure of a terminal device in a small cell deployment. The only way to achieve similar results would be by adopting the trivial scanning methods proposed in 802.11 ad and WiGiG, which, however, takes more time and cannot facilitate communication with the application layer.

According to an embodiment of the present invention, one or more applications may be enabled to interact with the location service via an interface of the location service entity. In this context it may be provided that the advanced features of beamforming are exposed to these (external) one or more applications, e.g. using a simple semantic based on geographical coordinates. Specifically, the applications may leverage the location service to feed the beamforming module of the access point or base station via the beamforming control interface with information about a user's terminal location.

According to an embodiment, an application may retrieve from the location service, e.g. by sending a corresponding request, a location estimation for a user terminal (e.g., through regression solutions), possibly together with a corresponding error estimation. Based on the location estimation received from the location service entity, the application may instruct the beamforming module to perform a scan for the user terminal. Specifically, the received location estimation may feed a search algorithm in such a way that the received location estimation serves as the initial search position.

According to an embodiment, the interaction between an application and the location service may be performed as a request/response communication or as a publish/subscribe communication. According to the request/response (or "pull") method, the application may issue the appropriate request message whenever its internal logic needs so, and retrieves the required information from the location service. In contrast, according to the publish/subscribe (or "push") method, the application subscribes to a notification service, in order to receive the information indicated in the subscription whenever it is available from the location service. As will be appreciated by those skilled in the art, the location service entity's interface towards the application may allow a number of other ways to be exploited.

According to an embodiment, the provision of location information may be performed by using a predefined information and data model, which specifies the allowed logical interactions together with the required input parameters and with the returned output parameters. The predefined information and data model may use a simple semantic based on geolocation (e.g., geographic coordinates) and/or contextual position (room, mall, aisle, etc.).

According to an embodiment of the invention, the at least one access point or base station may be implemented as a mmWave access point, where the described location service assisted mobile station engagement is to be particularly useful. However, the at least one access point or base station can also operate by using communications technologies that implement beamforming techniques different from the ones implemented by mmWave technology.

According to an embodiment of the invention, the system may include a location service database that is connected with the location service entity that stores the user location information (geolocation) in the form specified by the implemented information and data model and that is configured to associate a user's location with a user identifier. The user identifier may be represented by a 3GPP identifier, (e.g., IMSI, IMEI, etc.), or may be an alias used by the system to serve for identification purposes.

According to an embodiment, the one or more applications may interact with the location service entity via a location service interface and with the beamforming module either directly via a beamforming control interface or through the location service entity. The applications' interactions with the location service entity may serve the purpose of mediating the interactions between the location service entity and the at least one access point or base station. For instance, the applications may be configured to feed a beamforming module with information about a user's terminal location. In this context it may be provided that an application is implemented as a tracking application in charge of assisting the beamforming module to properly steer the boresight towards a user terminal's location. Generally, the applications may include different kinds of applications, in particular operator-owned, manufacturer's and third party's applications.

According to an embodiment, the beamforming module includes a beamforming control interface that terminates either at the location service entity or at any of the one or more applications.

When multiple beamforming modules are installed in the system, they may all be connected to the same location service. However, since this increases the complexity of the location service, according to an embodiment it may be provided that each of the multiple beamforming modules connects to a dedicated location service entity.

According to an embodiment of the invention, the system may be configured in a MEC deployment. In this case, the system may include a Mobile edge platform and a Mobile edge host, and the location service may be implemented as a Mobile edge location service, and the one or more applications may be implemented as Mobile edge applications.

According to an embodiment of the device of the present invention, the location service entity may include means for tracing user terminals' locations within the mobile network (a tracer). Alternatively, the location service entity may be configured to obtain user location information from an external source.

According to an embodiment of the device, the location service entity may include an interface towards the beamforming module of the at least one access point or base station of the mobile network. This interface may be configured to enable the location service entity to instruct the beamforming module to scan for a user terminal and to receive back results of the scan from the beamforming module.

According to an embodiment of the device the location service entity may include another interface that is configured to enable one or more applications to interact with the location service entity. In the context of this interaction, the interface may be configured to enable the applications to use the location service entity to feed the beamforming module of the at least one access point or base station via a beamforming control interface with information about a user's terminal location.

According to an embodiment of the device, the location service database may be configured to associate a user's location with a user's identifier.

According to an embodiment, the device may include an MEC, Mobile Edge Computing, Mobile edge platform and Mobile edge host, where the location service entity is a Mobile edge location service provided by the Mobile edge platform or installed in the Mobile edge host. The applications that are enabled to enter act with the location service entity may be implemented as a Mobile edge application installed in the Mobile edge host.

According to a specific embodiment, the present invention provides a method for facilitating and exposing the user's terminal position to operator-owned, manufacturer's and third party's applications by means of tracing and maintaining user location information and associated geolocation (e.g., geographic coordinates) and/or contextual position (room, mall, aisle, etc.) in a location service platform, including the steps of:

1) Deploying a location service platform, with an interface to access it and exchange the user's terminal location information using the proposed information and data model;
2) Deploying beamforming-capable wireless access points, with an interface to control them and exchange the user's terminal location information using the proposed information and data model;

3) Deploying an application that may mediate the interaction between the location service and the wireless access point, through the corresponding interfaces.

There are several ways how to design and further develop the teaching of the present invention in an advantageous way. To this end it is to be referred to the dependent patent claims on the one hand and to the following explanation of preferred embodiments of the invention by way of example, illustrated by the drawing on the other hand. In connection with the explanation of the preferred embodiments of the invention by the aid of the drawings, generally preferred embodiments and further developments of the teaching will be explained.

Embodiments of the present invention, as described hereinafter in detail, relate to a device, a system, and a method for providing location information within a mobile network with beamforming characteristics, in particular with a mmWave communications deployment. Operator-owned, manufacturer's and third party's applications can access the proposed location service in order to retrieve and/or store user's terminal location information from and to the network. In particular, the proposed method allows the mobile network operator to compute the user's terminal location information (e.g., geolocation) by leveraging mmWave directional communication properties. Conversely, a mmWave access point's controller can use pre-computed location information of a mobile station to speed up the beamforming procedure and signal synchronization with such station. Embodiments of the present invention specify the system communication architecture, providing details on each component and their operations, as well as the data model involved in the communication between different interfaces across service platform, and the application that needs to use the geolocation information.

Before returning to the detailed description of embodiments of the present invention, it is noted that, generally, in 3GPP networks the notion of user discovery with respect to a pre-subscribed service is specified by the Proximity-based Services (ProSe), for reference cf. 3GPP TS 23.303, Proximity-based Services (ProSe), Stage 2, Rel.13, March 2016. In ProSe the user subscribes to a particular service associated with a certain location, e.g., an advertising service of a certain brand, or a social application. Once the user's terminal is within the cell proximity of such a service, the network notifies the user to prepare for the service discovery process, which takes place by sending discovery broadcasts to identify the ProSe peer. Although, ProSe shares similarities with embodiments of the present invention with respect to the application/service discovery, the actual ProSe method is very different since it does not involve directional antennas neither need the geolocation of the user's terminal as in the case of mmWave communications.

FIG. 1 is a schematic view illustrating an embodiment of the present invention that relates to a communication method and architecture between a location service, a mmWave-based small cells deployment and an application. Specifically, the system according to the illustrated embodiment includes a mmWave access point or base station 1 being equipped with a beamforming (BF) module 2, a Location Service entity or platform 3, briefly denoted LS hereinafter, a Location Service DataBase (DB) 4, a location-aided application 5, a service registry 6, a Location Service API (LS-API) 7 and a beamforming control interface (BFCI) 8.

The BF module 2 is a logic component built in the mmWave access point 1; hence, the terms "BF module" and "mmWave access point" are sometimes used interchangeably hereinafter. In particular, the BF module 2 is in charge of beaming a particular geographical position associated with a user's terminal. Furthermore, the BF module 2 is in charge of getting the geographical position of a particular user's terminal already connected to the mmWave access point 1. Once a user (who is not yet connected to the mmWave access point 1) is discovered, the association procedure starts. The BF module 2 might need the user ID information, which may be retrieved from an external entity, by making use of conventional mechanisms. Since it is assumed that a skilled person is sufficiently familiar with such mechanisms for retrieving user ID information from external entities, a detailed description of this aspect is omitted here.

The LS 3 is in charge of storing and retrieving user location information (geolocation) to and from the Location Service DataBase (LS-DB) 4. It also offers an API, LS-API 7, to the application 5 in order to enable the application 5 to interact with the LS 3. According to some embodiments, the LS-API 7 may be used to communicate with the mmWave BF module 2 too.

The LS-DB 4 is configured to store the user location information (geolocation) in a particular form, which may be specified by a particular data model explained in more detail below. The LS-DB 4 is directly connected with the Location Service LS 3. The database's 4 primary scope is to associate a user's location with a user's identifier, which can be represented by a 3GPP identifier, (e.g., IMSI, IMEI, etc.), or by an alias used by the system to serve for identification purposes and provided by an (external) entity, which is out of the scope of the present invention.

According to the illustrated embodiment, the (location-aided) application 5, which may include, but not limited to, operator-owned, manufacturer's and third party's applications, can leverage the location service 3 through the corresponding API 7 to perform and/or enhance their operations. For instance, a special purpose application may implement a discovery algorithm that leverages the BF module's capabilities to get a user's geolocation within the small cells network. Such an application includes a direct or indirect interaction with the BF module 2 to perform advanced beamforming operations. For instance, it could include an advanced procedure to speed-up the user's terminal discovery operations during the association procedure, as will be explained in detail below in connection with FIGS. 3 and 6.

The service registry 6 provides information about the available services (e.g., location service) to the applications 5 that are authenticated for the first time, in order to enable the applications 5 to use such services. Applications 5 may interrogate it to discovery available services. As will be easily appreciated by those skilled in the art, beyond the authentication of applications 5 and the provision of information about available services, the service registry 6 may implement additional features, which are, however, out of the scope of the present invention.

The Location Service API (LS-API) 7 is the interface that enables applications 5 to interact with the Location Service 3. The data model and parameters included in the API will be described in detail below.

Finally, the beamforming control interface (BFCI) 8 is the interface terminated at the mmWave BF module 2 that enables communication either with the Location Service 3 or directly with an application 5.

The system according to the embodiment of FIG. 1 can be suitably used in a twofold, quasi bidirectional way: on the one hand it can be used to provide a user terminal's location information from the location service 3 to the mmWave access point 1, either directly or through a dedicated application 5, in order to create an association between the terminal and the access point 1. On the other hand, it can be used to provide the user terminal's location information from the mmWave access point 1 to the location service 3, either directly or through a dedicated application 5, in order to populate/update/refine the location service's 3 information base.

As already mentioned above, an application 5 may interact with the Location Service 3 through the LS-API 7, which may be configured to allow a number of different non-exclusive ways to be exploited. These ways may include, but not limited to, that the LS-API 7 implements a request/response or "pull" method, where the application 5 issues the appropriate request message whenever its internal logic needs so, and retrieves the required information from the LS 3. Alternatively or additionally, the LS-API 7 may implement a publish/subscribe or "push" method, where the application 5 subscribes to a notification service, in order to receive the information indicated in the subscription whenever it is available from the LS 3.

Considering both communication patterns as described above (i.e. the "pull" and the "push" method), a specific information and data model may be implemented for the LS-API 7. For instance, according to an embodiment of the present invention the following logical interactions issued by an application 5 towards the Location Service 3 to store or retrieve user terminal's location information may be implemented, as shown in Table 1:

TABLE 1

Logical Interactions in the LS-API 7

| Logical interaction | Input parameters | Returned parameters |
| --- | --- | --- |
| getPosition | Location type<br>User ID type + User ID<br>Subscription type<br>Mobility type<br>Tenant ID<br>Time interval | Location type<br>Location info<br>Timestamp<br>User ID type<br>User ID |

TABLE 1-continued

Logical Interactions in the LS-API 7

| Logical interaction | Input parameters | Returned parameters |
| --- | --- | --- |
| getIdentity | Location type<br>Area range type<br>Area range<br>Time interval | User ID type<br>User ID<br>Timestamp<br>Subscription type<br>Mobility type<br>Tenant ID |
| putPosition | Location type<br>Location info<br>User ID type<br>User ID<br>Timestamp<br>Subscription type<br>Mobility type<br>Tenant ID | STATUS code<br>(Success/Failure/Info) |
| connectivityRequest | User ID | void |

The logical interaction 'getPosition' lends itself to be used in multiple ways: it can be used to request the position of individual user(s) indicated by their user ID, and/or to request the position of a group of users indicated by, e.g., their subscription type, mobility type, tenant ID, etc. The request may include a time interval to get the information multiple times within this time interval.

The interaction 'getIdentity' may be used to collect the User-ID(s) or group type of the user(s) in the area specified by the respective request. The request may include a time interval to get the information multiple times within the interval.

The interaction 'putPosition' may be used to provide a new or update an existing entry in the Location service DataBase 4.

Finally, the interaction 'connectivityRequest' may be used to trigger the association procedure with a mobile station. It can be sent only by the LS 3 to an application 5.

The table below shows a data model and a resource type according to an embodiment of the present invention that may be used in the logical interactions of the LS-API 7.

TABLE 2

Information elements in the LS-API

| Element/sub-element | | Type | Description |
| --- | --- | --- | --- |
| Location type | | String | It indicates how the location info is provided, among the location types specified below |
| Localization source | | Numeric/string | It indicates which localization mechanism has been used to provide the location information |
| Location info | Absolute coordinates [γ] | Longitude: a°, b'c";<br>Latitude: d°, e'f";<br>Altitude: [m] | Longitude in degrees, primes and seconds<br>Latitude in degrees, primes and seconds<br>Altitude in meters above sea level |
| | Relative coordinates + Reference point [μ] | Cartesian (x, y, z) or polar (r, φ, θ) coordinates<br>Longitude: a°, b'c";<br>Latitude: d°, e'f";<br>altitude: [m] | Cartesian or polar coordinate system from a reference point<br>Longitude in degrees, primes and seconds<br>Latitude in degrees, primes and seconds<br>Altitude in meters above sea level |
| | Error estimation [γ, μ] | Numeric [m] | It indicates the position estimation within a certain confidentiality interval |
| | Cell (or sector) ID [ς] | String/numeric | Cell (or sector) Identifier based on operator's policy |
| | Contextual [ξ] | String | Position based on context defined by the operator (e.g., room, hall, aisle, etc.) |

TABLE 2-continued

Information elements in the LS-API

| Element/sub-element | | Type | Description |
|---|---|---|---|
| Area range type | | String | It indicates how the area range is provided, among the range types specified below |
| Area range | Circular range (γ) | Coordinates of center + radius | Coordinates can be absolute or relative |
| | Rectangular range (μ) | Coordinates of opposite vertices | Coordinates can be absolute or relative |
| | Polygon (ζ) | Coordinates of vertices | Coordinates can be absolute or relative |
| User ID type | | String | it indicates how the user ID is provided, |
| User ID | Subscriber ID (IMSI, TMSI, etc.) (γ) | Numeric | Identification of mobile subscribers as per 3GPP TS 23.003 |
| | Mobile station ID (IMEI, IMEISV) (γ) | Numeric | Defined by 3GPP TS 23.003 |
| | User alias (μ) | String/numeric | Identification mechanism within the system based on operator's policy |
| | IP address (ν) | Numeric | IPv4 or IPv6 address (IETF RFC 791 and RFC 2460) |
| Timestamp | | Numeric | Time of day based on the time method configured by the operator |
| Time interval | | Start and stop time | Starting and ending time of the interval |
| Subscription type | | String | Describes the service the user has subscribed to |
| Mobility type | | String/numeric | Defines the mobility characteristics (static, low, high, etc) according to operator's policy |
| Tenant ID | | String/numeric | Identifies the tenant the user belongs to, as per the policy defined by the operator for the tenants served by the system (if any) |

NOTES:
Parameters in bold are mandatory in the embodiment. However, some of them are mutually exclusive: when the same symbol (γ, μ, ν, ζ, ξ) is applied, those parameters can be specified together.

As already mentioned above, the BF Module 2 terminates the Beamforming control interface BFCI 8, which may be used by an application 5 to configure the beamforming mechanism. The BFCI 8 may be designed to support a request/response (client/server) communication model, started by an application 5. An information and data model for BFCI 8 the in accordance with an embodiment of the present invention may implement the logical interactions/remote calls illustrated in the following table:

TABLE 3

Logical interaction in the BFCI

| Logical interaction | Input parameters | Returned parameters | Description |
|---|---|---|---|
| Sent to the BF module | | | |
| setBeam | Beam power Beam width Beam direction angle (θ) Beam height angle (phi) | STATUS code (Success/Failure/Info) | Used to configure the beamforming parameters |
| isConnected | User ID | Boolean | Used to assess if a user's terminal is associated with the access point |
| Sent by the BF module | | | |
| isConnected | User ID Beam power Beam width Beam direction angle (θ) Beam height angle (phi) | Void | Used to convey the beamforming parameters for a user's terminal that gets connected |

TABLE 3-continued

Logical interaction in the BFCI

| Logical interaction | Input parameters | Returned parameters | Description |
| --- | --- | --- | --- |
| connectionLost | User ID<br>Beam power<br>Beam width<br>Beam direction<br>angle (θ) Beam<br>height angle<br>(phi) | Void | Used to convey the beamforming parameter for a user's terminal that gets disconnected |
| connectivityRequest | User ID | void | Used to trigger the association procedure with a user's terminal |

The table below shows a data model and resource type used in the logical interactions of the BFCI 8 in accordance with an embodiment of the present invention.

TABLE 4

Information elements in the BFCI

| Element/sub-element | | Type | Description |
| --- | --- | --- | --- |
| Beam power | | Numeric | It indicates the transmitting power used by the mmWave access point |
| Beam width | | Numeric | Angular width of main radiating lobe |
| Beam azimuth angle | | Numeric | Angle of the main radiating lobe's axis on the horizontal plane |
| Beam tilt angle | | Numeric | Angle of the main radiating lobe's axis on the vertical plane |
| User ID | Subscriber ID (IMSI, TMSI, etc.) [γ] | Numeric | Identification of mobile subscribers as per 3GPP TS 23.003 |
| | Mobile station ID (IMEI, IMEISV) [γ] | Numeric | Defined by 3GPP TS 23.003 |
| | User alias [μ] | String/numeric | Identification mechanism within the system based on operator's policy |
| | IP address [ν] | Numeric | IPv4 or IPv6 address (IETF RFC 791 and RFC 2460) |

NOTES:
Parameters in bold are mandatory. However, some of them are mutually exclusive: when the same symbol [γ, μ, ν] is applied, those parameters can be specified together.

The system described above in connection with FIG. 1 can be modified and deployed following different embodiment options, depending on the endpoints of the Beamforming control interface (BFCI). Whereas one endpoint is always terminated at the Beamforming module, the other can be terminated either at i) the application (connected to the location service through the LS-API), or at ii) the location service.

Figure 2:
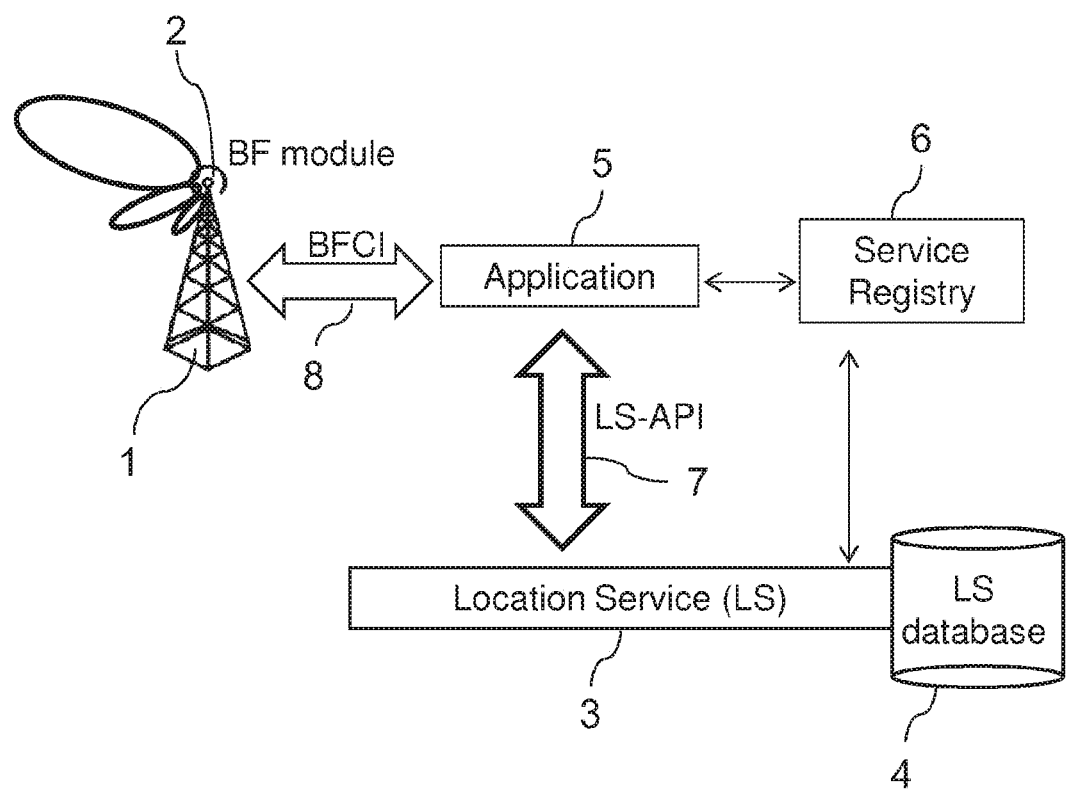
FIG. 2 is a schematic view illustrating a deployment scenario with the BF module being connected to the application in accordance with embodiments of the present invention.

FIG. 2, where like reference numbers denote like elements as in FIG. 1, illustrates an embodiment where the BF module 2 is connected to a (controller) application 5. In other words, in this configuration, the application 5 has a direct connection with the BF module 2, which allows the application 5 to read and write location information from and to the location database 4, and then operate the BF module 2 accordingly.

Generally, this configuration allows to install multiple BF modules 2 and to connect them to a single application 5. Alternatively, each of the multiple BF modules 2 may be connected to a dedicated application 5.

In any case, the illustrated embodiment enables location service assisted mobile station engagement, as will be described hereinafter in connection with FIG. 3. While the embodiment of FIG. 3 specifically relates to mmWave technology, it will be easily appreciated by those skilled in the art that the described location service assisted mobile station engagement can be performed in connection with communications technologies that implement beamforming techniques different from the ones implemented by mmWave technology.

In mmWave communications, only those mobile stations (namely UEs, according to the 3GPP terminology) that fall within the LoS (Line of Sight) region of a transmitter can benefit from the highly effective communications. (Potentially, the mmWave transceivers could exploit the first reflected beam as well; still the directivity of the transceivers would play a paramount role.) However, the highly directional antennas reduce the LoS area to a narrow beam in the radiating direction. It is therefore important for a transmitter to "engage" a mobile station before starting the data transmission to and from it. Therefore, a transmitter should acquire the target station in its radiating main lobe to ensure a successful data transmission. There are already different algorithms that enable a transmitter to search for a terminal in the surrounding area by modifying the radiation pattern until the target station is engaged. According to embodiments of the present invention such an operation is supported in two different ways, which are i) decoupling of the logic of the searching algorithm from the transmitter beamforming module, and ii) usage of the location service to get a first estimation of the user's terminal location (e.g., through regression solutions), used to feed the algorithm initialization.

Figure 3:
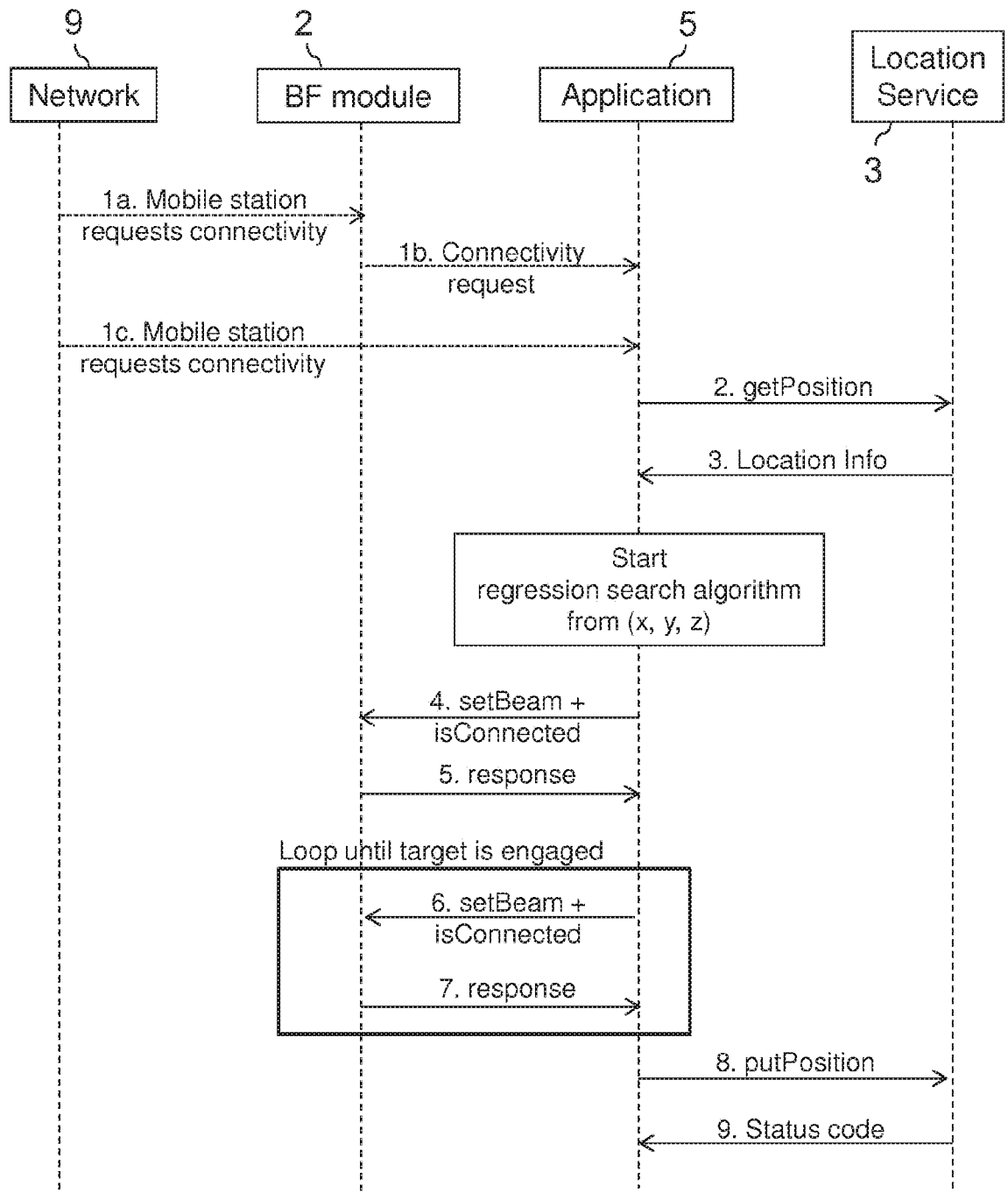
FIG. 3 is a sequence diagram illustrating location service assisted station engagement in case the BF module is connected to an application in accordance with embodiments of the present invention.

FIG. 3 is a sequence diagram illustrating location service assisted station engagement in accordance with embodiments of the present invention, applied in the deployment scenario of FIG. 2, i.e. in case the BF module 2 is connected to an application 5. As will be easily appreciated by those skilled in the art, some of the steps described below may be executed in a different sequence or may even be omitted, where applicable.

As shown in FIG. 3, in a first step the network 9 (i.e. an appropriate component within the network that holds the respective information, e.g. MME, Mobility Management Entity) informs the system that a new user is coming under the mmWave BF module's 2 coverage and looking for the directional synchronization signal. The mmWave BF module 2 shall start the discovery procedure. In step 1a, the network 9 sends the trigger to the mmWave BF module 2 and, in step 1b, the mmWave BF module 2 forwards the trigger to the application 5 to start the discovery procedure, with the mobile station ID of the incoming user (hereinafter denoted userID). Alternatively to steps 1a and 1b, the network 9 may send the connection request trigger to the application 5, as shown in step 1c.

Next, shown as step 2 in FIG. 3, the application 5 calls the Location Service 3 to get a location estimation for userID, if available. In step 3, the Location Service 3 replies with the location estimation and the error estimation. These parameters feed the initialization of a searching algorithm. If the user joins the network for the first time, no previous location information are retrieved from the Location Service 3. In this case, the searching algorithm may be initialized with default location values that may be either predefined or may be determined from case to case.

As shown in step 4, the application 5 issues a command to set the transmitter, i.e. the BF module 2, on the initial search position in order to beam the user. The BF module 2 performs a first scan accordingly and sends back the results of this scan to the application 5 in step 5.

If the first scan was not successful, i.e. if the user could not be engaged, the method, based on the search algorithm, proceeds by identifying a new searching area, which is communicated to the BF module 2, as shown in step 6. The application 5 receives the results of the search task in step 7. If the target station is still not engaged, the sequence is repeated from step 6.

Finally, the desired target terminal will be engaged and the data transmission can start. The final location computed by the algorithm is sent back to the Location Service 3, as shown in step 8, to keep track of the updated user location. In case of discovery failure, however, no position information are stored or updated and the process aborts. This could happen, for instance, if the user is placed behind an obstacle and cannot be reached by the synchronization signal.

As shown in step 9, it may be provided that the Location Service 3 acknowledges the location update.

Figure 4:
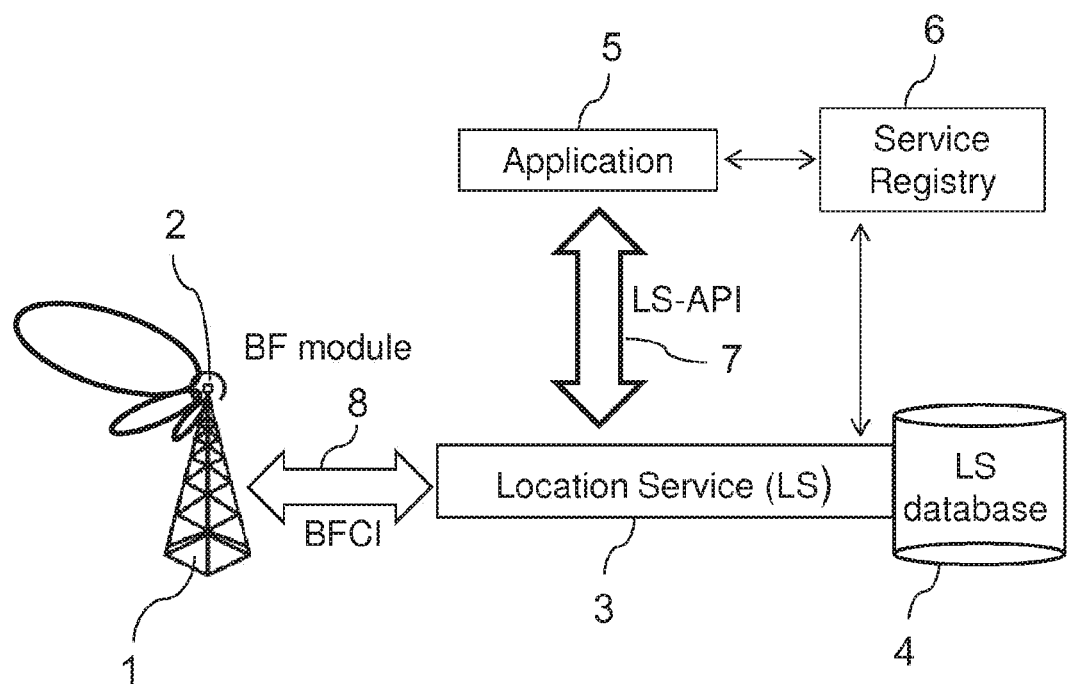
FIG. 4 is a schematic view illustrating a deployment scenario with the BF module being connected to the location service in accordance with embodiments of the present invention.

Turning now to FIG. 4, this figure illustrates an embodiment of the present invention where the BF module 2 is connected to the Location Service, LS, 3 so that an application 5 communicates with the BF module 2 through the LS 3. The corresponding communication flow for location service assisted station engagement in such configuration is described below in connection with FIG. 6.

It should be noted that when multiple BF modules 2 are installed in the system, they can all be connected to one and the same LS 3 shown in FIG. 4, even though the different BF modules 2 may belong to different vendors. However, this will increase the complexity of the LS 3, which shall be able to aggregate consistently the information and dispatch the communications appropriately with different BF modules 2.

Figure 5:
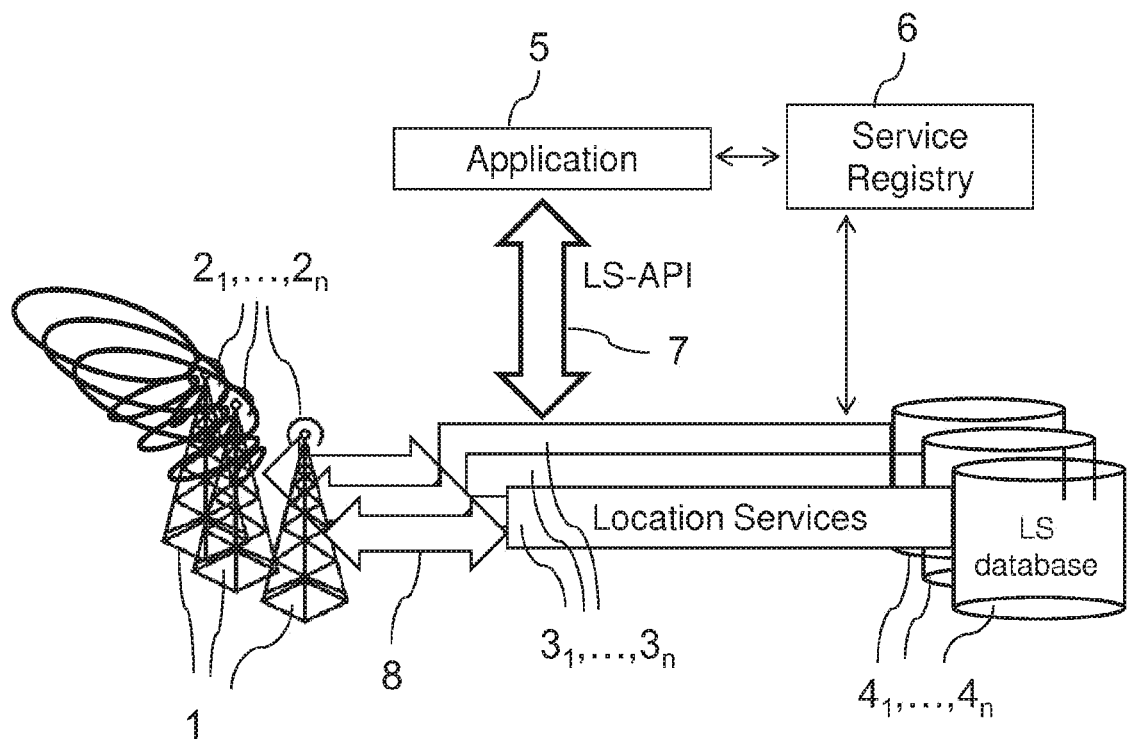
FIG. 5 is a schematic view illustrating a deployment scenario with multiple BF modules, each being connected to a dedicated location service in accordance with embodiments of the present invention.

In view of the above, an alternative configuration may be implemented in which each BF module $2_1, \ldots, 2_n$ connects to a dedicated Location Service 3, resulting in different Location Service entities $3_1, \ldots, 3_n$, as depicted in FIG. 5. This increases the complexity of the application 5 though, which has to contact each Location Service $3_i$ separately and discover through the Service Registry 6 which is the BF module $2_1, \ldots, 2_n$ connected.

Figure 6:
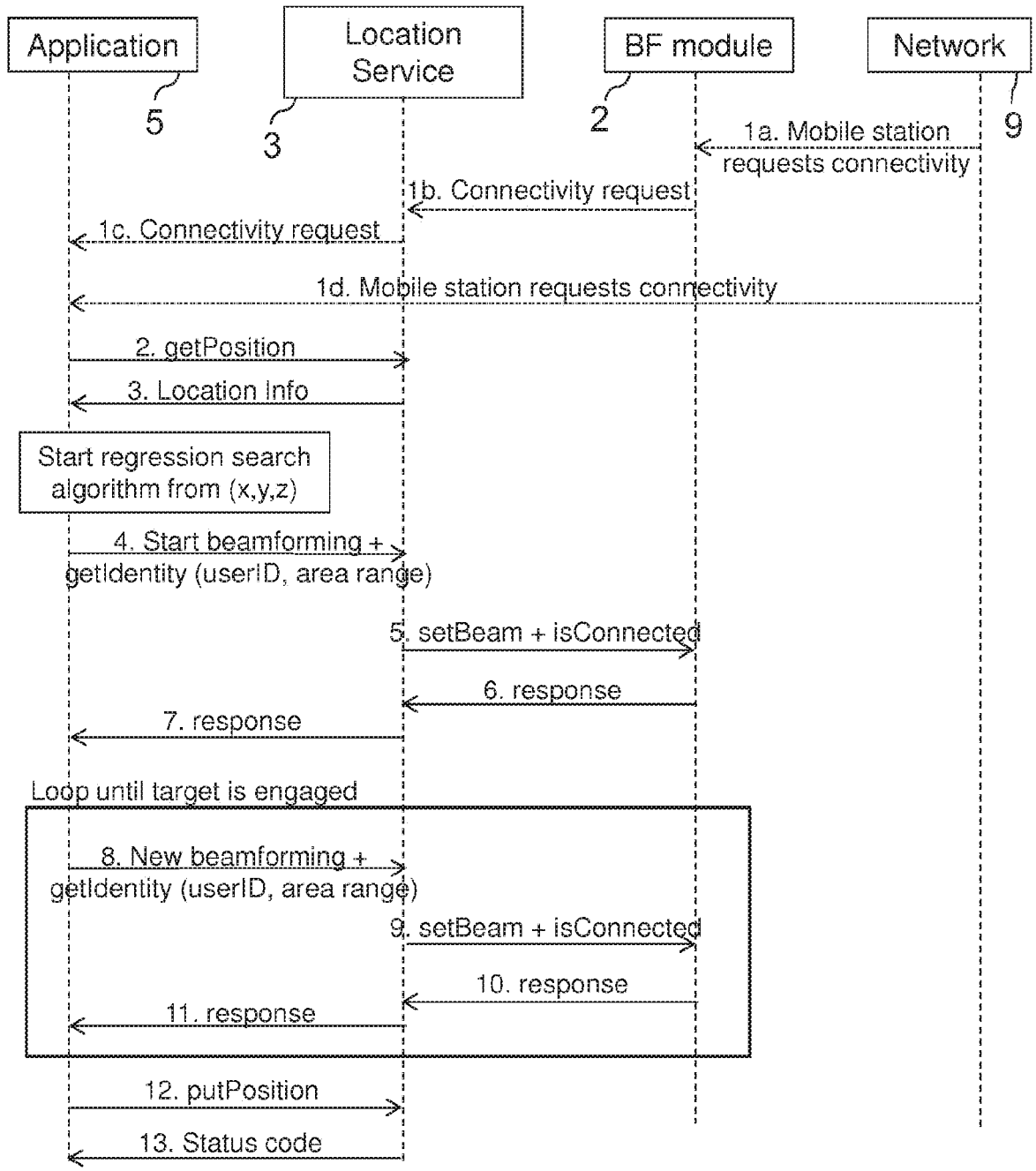
FIG. 6 is a sequence diagram illustrating location service assisted station engagement in case the BF module is connected to the location service in accordance with embodiments of the present invention.

FIG. 6 illustrates an embodiment of the present invention related to a location service assisted station engagement in case the BF module 2 is connected to the location service 3, as shown in FIG. 4. When the system is deployed as per the configuration described here in connection with the embodiment of FIG. 6, the communication flow undergoes major changes compared to the previously described embodiments, as will be described hereinafter in detail. It should be noted that the application entity 5 could be envisaged as a tracking application in charge of assisting the BF module to properly steer the boresight towards the user location. Further, as will be easily appreciated by those skilled in the art, some of the steps described below may be executed in a different sequence or may even be omitted, where applicable.

In a first step, the network 9 (i.e. an appropriate component within the network that holds the respective information, e.g. MME, Mobility Management Entity) informs the system that a new user is coming under the BF module's 2 coverage and looking for the directional synchronization signal. The mmWave BF module 2 shall start the discovery procedure.

Specifically, in step 1a, the network 9 sends the trigger to the mmWave BF module 2. In step 1b, the mmWave BF module 2 forwards the trigger to the location service 3 to start the discovery procedure with the mobile station ID—userID—of the incoming user. In step 1c, the request is forwarded by the location service 3 to the application 5. Alternatively to steps 1a, 1b and 1c, the network 9 may send the connection request trigger to the application 5, as shown in step 1d of FIG. 6.

As shown in step 2, the application 5 calls the Location Service 3 to get an location estimation for the userID, if available.

As shown in step 3, the Location Service 3 replies with a location estimation and an error estimation. These parameters feed the initialization of a searching algorithm. If the user joins the network for the first time, no previous location information are retrieved from the Location Service 3. In this case, the searching algorithm may be initialized with default location values that may be either predefined or may be determined from case to case.

As shown in step 4, the application 5 sends a start beamforming request to the Location Service 3, including the initial search position (denoted 'area range' in FIG. 6) obtained by the initial application of the searching algorithm together with the user ID.

As shown in step 5, the Location Service 3 translates the command into primitives for the BF module 2 to steer the transmitter beam. In step 6 the BF module 2 (or, to be more specific, the antenna controller of BF module 2) sends back the output information from the first scan, and in step 7 the output information are forwarded to the application 5.

As shown in step 8, based on the search algorithm, a new searching area is identified and communicated to the Location Service 3. The antenna controller/BF module 2 obtains the new search area to scan from the Location Service 3 (step 9). In step 10 the search results are sent to the Location Service 3, and in step 11 the application 5 receives the results of the search tasks. If the target station is not yet engaged, the sequence is repeated from step 9.

As shown in step 12, the desired target terminal is engaged and the data transmission can start. The final location computed by the algorithm is sent back to the Location Service 3 to keep track of the updated user location. In case of discovery failure, no position information are stored or updated and the process aborts. This could happen, e.g., if the user is placed behind an obstacle and cannot be reached by the synchronization signal. Finally, as shown in step 13, the Location Service 3 may acknowledge the location update request.

Figure 7:
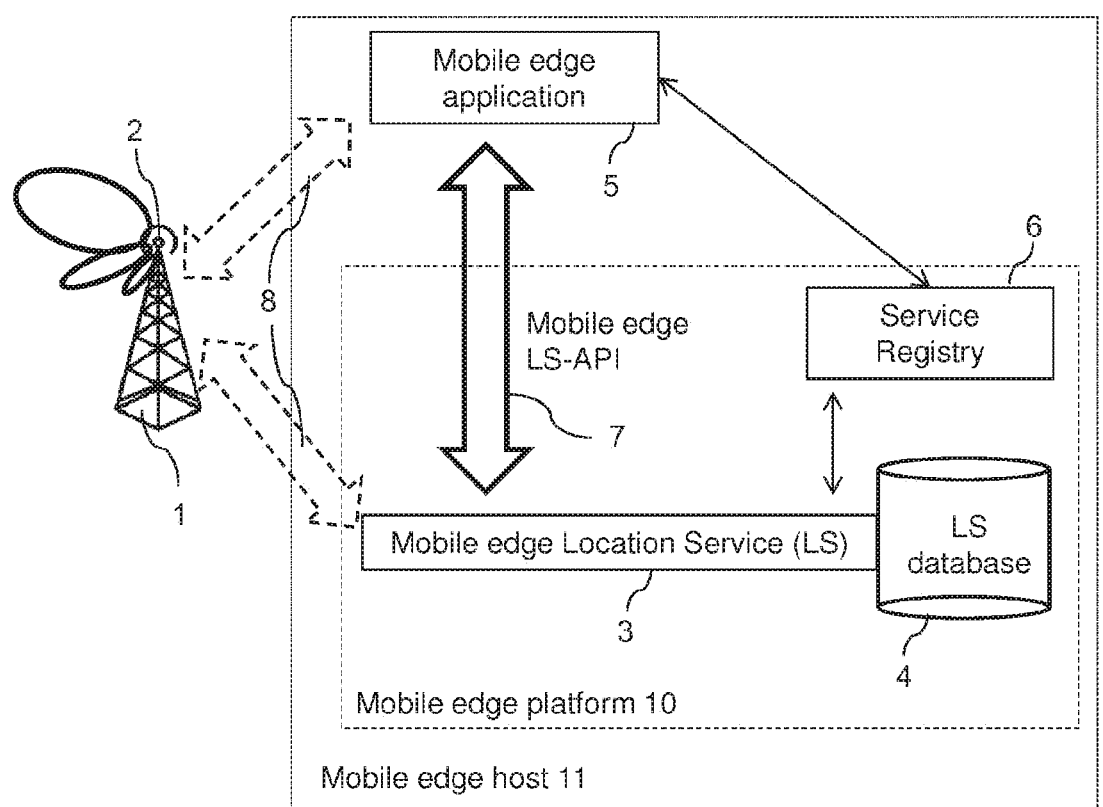
FIG. 7 is a schematic view illustrating a deployment scenario in a mobile edge system in accordance with embodiments of the present invention.

Turning now to FIG. 7, this figure illustrates a system configuration in an MEC (Mobile Edge Computing) deployment in accordance with an embodiment of the invention. Generally, the MEC technology (as described in ETSI GS MEC 003 V1.1.1 (2016-03): "Mobile Edge Computing (MEC); Framework and Reference Architecture", which is incorporated herein by way of reference) enables third party's application to be installed in the operator's premises, such as the Radio Access Network, and to benefit from dedicated services offered by the mobile edge platform (as shown/described in sections 5 and 7.1.2 of the document cited above). One of such services is the mobile edge location service (as described in section 8.3 of the above document), accessible through a dedicated API.

In this context, it is noted that the mobile edge computing (MEC) concept can bring intelligence and enhance the operations at the edge of a mobile network. Specifically, MEC provides the facilities (provided by the Mobile edge platform installed in a Mobile edge host) bringing computational power and storage at the edge to enable applications to run in the networks' edge, in proximity to the users, and exploits its privileged location to provide additional services to applications, e.g., user location, radio analytics, etc.

The system proposed in the present invention finds a natural application in an MEC deployment. By referring to the MEC architecture as disclosed in the above document, the configuration illustrated in FIG. 7 can be described as follows, where like numerals denote like corresponding elements as in the previously described embodiments:

In the MEC deployment illustrated in FIG. 7, the location service 3 (and the LS database 4) as described in the embodiments above is embodied by the Mobile edge Location Service 3, as described in ETSI GS MEC 013 V0.0.1 (2016-03): "Mobile Edge Computing (MEC); Location Service API"—work in progress, which is incorporated herein by way of reference. Similarly, the LS API becomes the Mobile edge Location Service API 7.

The location service 3 is offered by the Mobile edge platform 10 and discovered by applications 5 through the Service Registry 6, included in the platform 10 itself. Here, it should be noted that a mobile edge service, like the Location Service 3, can be offered as well by an application external to the platform 10. Still, such service would be exposed through the platform's 10 service registry 6 and offered through the location service API 7, thus without affecting the described operations.

The controller application would be installed in the mobile edge host 11 as a mobile edge application 5. The mobile edge host 11 is the logical container of the platform 10 and of the mobile edge application 5. The BF module 2 would be external to the Mobile edge host 11, as shown in FIG. 7.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing location information within a mobile network with beamforming characteristics, wherein the mobile network comprises at least one access point or base station that includes a beamforming module, the beamforming module including a directional antenna and a beamforming control interface, the method comprising:

tracing and maintaining location information for user terminals in a location service deployed in the mobile network, providing location information of a particular user terminal from the location service to the beamforming module, enabling one or more applications to interact with the location service via an interface of the location service, wherein the one or more applications utilize the location service to feed the beamforming module of the at least one access point or base station via the beamforming control interface, and receiving updated location information of the particular user terminal from the at least one access point or base station in order to populate, update, and/or refine the location information associated with the particular user terminal in a location service database of the location service, wherein an application of the one or more applications, located in a particular access point or base station, is configured to receive the location information for the particular user terminal from the location service and instructs the beamforming module, via the beamforming control interface, to scan for the user terminal based on a search algorithm that is fed with the location information as an initial search position.

2. The method according to claim 1, wherein the interaction between the one or more applications and the location service is performed as a request/response communication or as a publish/subscribe communication.

3. The method according to claim 1, wherein a provision of the location information is performed by using a predefined information and data model.

4. A device for providing location information within a mobile network with beamforming characteristics, the device comprising:

a location service configured to collect location information for user terminals, and a location service database connected with the location service for storing the location information for user terminals, wherein the location service is configured to provide the location information of a particular user terminal to a beamforming module of at least one access point or base station of the mobile network, the beamforming module including a directional antenna and a beamforming control interface, wherein the location service comprises an interface that is configured to enable one or more applications to interact with the location service and to utilize the location service to feed the beamforming module of the at least one access point or base station via the beamforming control interface, and wherein the location service is configured to receive updated location information of the particular user terminal from the at least one access point or base station in order to populate, update and/or refine the location information associated with the particular user terminal in the location service database, wherein an application of the one or more applications, located in a particular access point or base station, is configured to receive the location information for the particular user terminal from the location service and instructs the beamforming module, via the beamforming control interface, to scan for the user terminal based on a search algorithm that is fed with the location information as an initial search position.

5. The device according to claim 4, wherein the location service is configured to trace locations of user terminals within the mobile network.

6. The device according to claim 4, wherein the interface is further configured to enable the location service to instruct the beamforming module to scan for the particular user terminal and to receive results of the scan from the beamforming module.

7. The device according to claim 4, wherein the location service database is configured to associate the location information for the particular user terminal with an identifier associated with the particular user terminal.

8. The device according to claim 4, further comprising a Mobile Edge Computing, a Mobile edge platform, and a Mobile edge host, wherein the location service is a Mobile edge location service provided by the Mobile edge platform or installed in the Mobile edge host, and/or wherein the application is a Mobile edge application installed in the Mobile edge host.

9. A system for providing location information within a mobile network with beamforming characteristics, the system comprising:

at least one access point or base station including a beamforming module, the beamforming module including a directional antenna and a beamforming control interface, and a location service configured to trace and maintain location information for user terminals, wherein the location service is configured to provide the location information of a particular user terminal to the beamforming module of the at least one access point or base station via a beamforming control interface, wherein the location service comprises an interface that is configured to enable one or more applications to interact with the location service and to utilize the location service to feed the beamforming module of the at least one access point or base station via the beamforming control interface, and wherein the at least one access point or base station is configured to provide updated location information of the particular user terminal to the location service in order to populate, update, and/or refine the location information associated with the particular user terminal in a location service database of the location service entity, wherein an application of the one or more applications, located in a particular access point or base station, is configured to receive the location information for the particular user terminal from the location service and instructs the beamforming module, via the beamforming control interface, to scan for the user terminal based on a search algorithm that is fed with the location information as an initial search position.

10. The system according to claim 9, wherein an application of the one or more applications is implemented as a tracking application that is configured to assist the beamforming module to steer a boresight towards a location.

11. The system according to claim 9, comprising multiple beamforming modules, wherein each of the multiple beamforming modules connects to a dedicated location service.

* * * * *